2,115,569

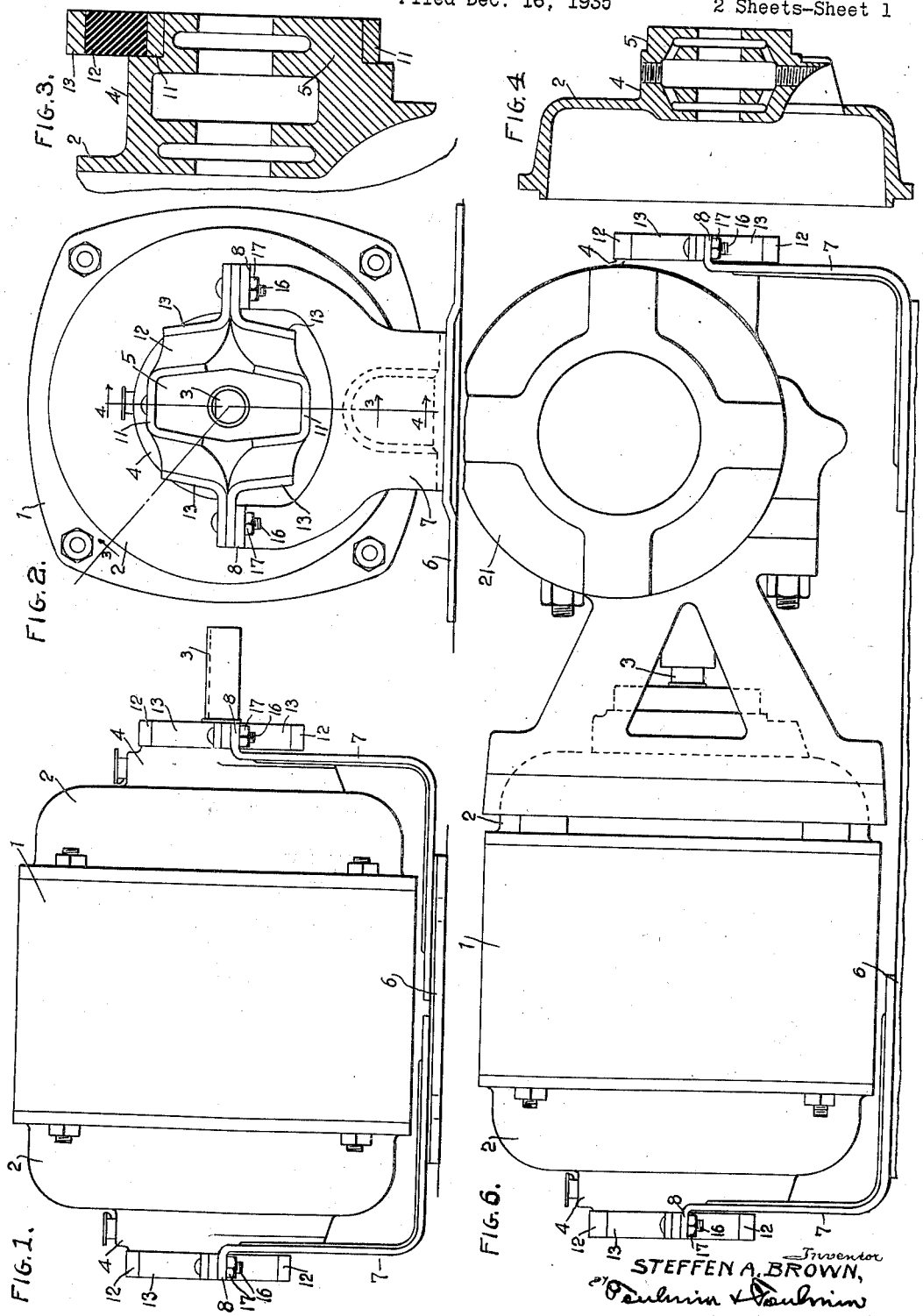
April 26, 1938. S. A. BROWN 2,115,569
MOUNTING MEANS
Filed Dec. 16, 1935 2 Sheets-Sheet 1
Inventor
STEFFEN A. BROWN,
Attorneys April 26, 1938.　　　　S. A. BROWN　　　　2,115,569
MOUNTING MEANS
Filed Dec. 16, 1935　　　　2 Sheets-Sheet 2
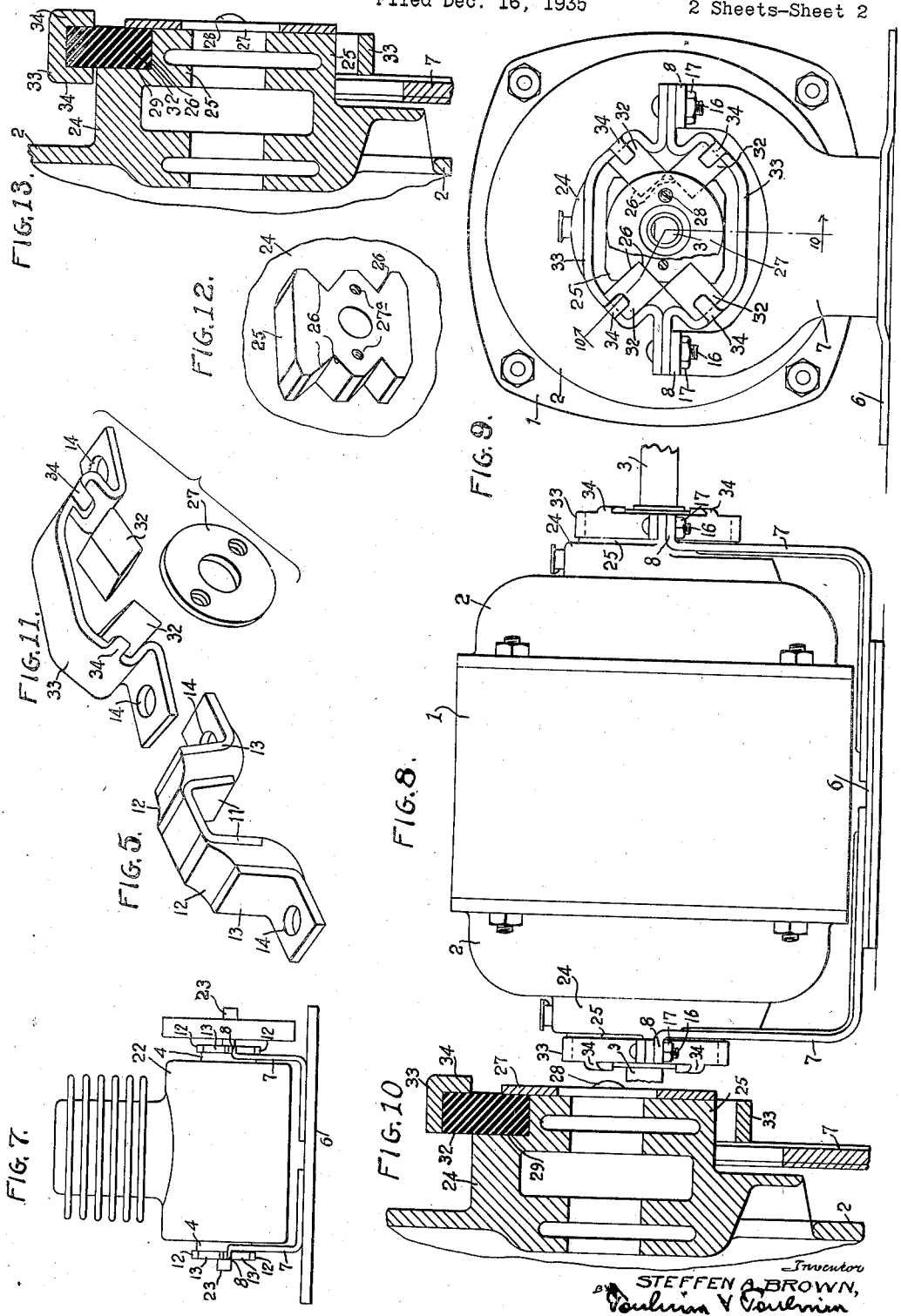
Inventor
STEFFEN A. BROWN,
Attorneys Patented Apr. 26, 1938

UNITED STATES PATENT OFFICE 2,115,569

MOUNTING MEANS

Steffen A. Brown, Dayton, Ohio, assignor to The Brown-Brockmeyer Co., Inc., Dayton, Ohio, a corporation of Ohio Application December 16, 1935, Serial No. 54,632

7 Claims. (Cl. 248—26)

This invention relates to mounting means for power mechanisms and has for its object to provide means for supporting such mechanisms that, in operation, they shall be substantially vibrationless.

It is also an object of the invention to provide a mounting for an operating mechanism which will provide a resilient, firm and efficient suspension of the mechanism.

It is a further object of the invention to provide a motor mounting which will reduce vibration of the operating mechanism to a minimum and which will further, of itself, dampen the vibrations thereof.

It is a further object of the invention to provide a motor support composed, in part, of rubber, wherein the vibration damping properties of rubber in shear are utilized to prevent excessive vibration of the mechanism in operation.

It is a further object of the invention to provide a resilient support for electric motors or the like, which will provide silence of operation at high speeds and will prevent undue noise and vibration at any speed and particularly noise and vibration due to a change of operating speed as, for instance, that which is encountered in stopping or starting the motor.

It is a further object of the invention to provide means arranged about the hub of an electric motor or the like, whereby to suspend the motor by the hub thereof in such manner as to oppose rotary movement of the motor casing or housing about its axis by the action of rubber in shear, whereby to support the motor for the utmost vibrationless and silent operation regardless of its operating speed.

It is a further object of the invention to provide means for supporting a rotating electric motor or the like about its axis by a mounting including resilient means for damping vibrations of the motor or the like, regardless of its speed of operation or of fluctuation thereof.

These and other advantages will appear from the following description taken in connection with the drawings, in which a preferred embodiment is shown for the purpose of illustration.

Referring to the drawings:

Figure 1 is a side elevation of a conventional electric motor suspended according to my invention;

Figure 2 is an end elevation of the structure shown in Figure 1;

Figure 3 is an enlarged detailed sectional view taken on the line 3—3 of Figure 2, showing the hub of the motor and casting or casing suspended in the motor mounting, with the end casting or casing of the motor partially broken away;

Figure 4 is a sectional view of the motor and casting or cover taken on the line 4—4 of Figure 2;

Figure 5 is an isometric view of a preferred embodiment of a motor support;

Figure 6 is a side elevational view, showing my supporting means in use to support a pump and driving motor integrally attached thereto, with the motor supports disposed about the line of the axis of the motor;

Figure 7 is a side elevational view of a conventional compressor supported according to my invention;

Figure 8 is a side elevational view similar to Figure 1, but showing a motor supported in supports according to another embodiment of my invention;

Figure 9 is an end elevational view of the motor and support shown in Figure 8;

Figure 10 is an enlarged detailed sectional view of the motor and casting or cover, as shown in Figures 7 and 8, taken on the line 10—10 of Figure 9 with the end casting or cover partially broken away;

Figure 11 is an exploded isometric view of the motor supports shown in Figures 8, 9 and 10;

Figure 12 is an end elevational view of a motor end casting or cover, as shown in Figures 8, 9 and 10, showing the configuration of my motor supporting hub;

Figure 13 is an enlarged detailed sectional view similar to Figure 10, but showing a modification of the clamp of the motor support.

As illustrated in Figures 1 and 2, the motor is of the conventional type, having a casing comprising an annular body casting 1 and end castings or covers 2 for supporting the armature which is mounted upon the motor shaft 3. These end castings or covers 2 have bosses 4 on which are shoulders forming non-circular hubs 5, which may be of any desired shape, so long as they are not circular. The hubs 5 are each adapted to snugly fit into a pair of cooperating motor supports described below. The motor supporting means comprises a base cradle composed of a base plate or member 6 and a pair of bifurcated cradle standards 7, which are substantially L-shaped in section, and which may be bolted or otherwise secured in any suitable manner to the base plate or member 6. The base plate 6 and bifurcated cradle standards 7 may be made integral, if desired. At the upper furcations, the cradle standards 7 are bent over to provide horizontally disposed flanges 8. The cradle standards 7 are identical at either end of the base cradle and likewise the motor end castings or covers 2 and the hubs 5 on the bosses 4 are of identical configuration.

The means for supporting the motor in the base cradle comprises a pair of motor supports mounted about the non-circular hubs 5 on the bosses 4 of the end castings or covers 2 of the motor. These motor supports each comprise a metal bearing member of a section complementary to a part of the hub 5, and, as illustrated are substantially U-shaped and are designated 11. Integrally secured to the opposite sides of the bearing member 11 are blocks 12 of rubber or the like, which blocks are also integrally secured to the upstanding legs of a pair of substantially L-shaped angles 13, the other legs of which are substantially horizontally disposed and adapted to be supported by the flanges 8 of the cradle standards 7. As shown in Figure 2, these motor supports are placed about the hubs 5 of the motor and castings 2 in oppositely disposed relation so that each pair of bearing members 11 thereof closely engages a hub 5, and so that the horizontally disposed legs of the angles 13 are supported on the flanges 8 of the cradle standards 7. The horizontally disposed legs of the angles 13 preferably have holes 14 drilled therein by means of which they may be rigidly secured to the flanges 8 by means of a bolt 16 and nut 17 or any other suitable means. Although the base cradle is shown as formed of pressed steel, it is, of course, understood that other constructions thereof along with shapes varying to suit the particular conditions are within the scope of the invention. The integral attachment of the blocks 12 of rubber or the like to the bearing members 11 and angles 13 is achieved preferably by vulcanization, although it is understood that other methods may be used to integrally secure these parts together.

As will be understood, the bearing members 11, which are in contact with the hubs 5, are separated by the blocks 12 from the angles 13, which are rigidly connected to the base cradle, and it is therefore clear that the motor is supported by the rubber blocks in shear for damping of all vibration of the motor casing, either axially of the motor or radially thereof.

In Figure 6, is shown an application of the mounting of my invention to an integral mechanical structure comprising a pump 21 integrally connected to a motor 1, the supporting structure comprising a pair of cradle standards 7 having motor supports integrally attached to the flanges 8 in the same manner as is shown in Figures 1, 2 and 3, which motor supports cooperate with hubs identical with hubs 5 shown in Figures 1, 2 and 3, formed on bosses disposed respectively coaxially with respect to the motor shaft 3 on one of the motor end castings or covers 2 at one end and formed on the side of the pump 21 at the opposite end, as shown at the righthand side of Figure 6. The operation of the motor supports and the manner of their mounting upon the motor and pump respectively is the same as that disclosed in Figures 1, 2 and 3. In Figure 7, I have disclosed the application of the mounting of my device to a conventional compressor 22, and it is to be understood that hubs similar to hubs 5, shown in Figures 1, 2 and 3, are formed at opposite ends of the compressor casting 22 coaxial with respect to the shaft 23 of the compressor, the mounting of the compressor in the cradle standards 7 being accomplished in the same manner as is the mounting of the motor 1 in the cradle standards 7, shown in Figures 1, 2 and 3.

It is to be understood that the above disclosed uses of the mounting of my invention are merely illustrative and that my invention is susceptible of application to mechanisms of widely divergent characteristics, wherever it may be found advantageous to provide for substantially vibrationless support thereof. It will be clear that the resiliency of the blocks 12 permits a slight degree of rotary movement of the motor 1 about its axis in the cradle supports 7, when starting or stopping or change of operating speed thereof occurs, which movement is resiliently resisted by the blocks 12, which are in shear. By this means a substantial reduction in the stress and strain transmitted to the operating parts of the motor during operation is accomplished. It is likewise clear that my resilient motor support means will reduce the shock of momentary overloading of the motor and will dampen all vibrations occurring during operation and will provide for more silent and vibrationless operation thereof than may be otherwise achieved.

In Figures 8 to 13 inclusive, I have illustrated another embodiment of my motor supporting means, by which I am able to achieve the advantages achieved by the use of the supporting means disclosed in Figures 1 to 7 inclusive, but in which a slightly different construction of motor mountings and hubs are utilized. The base cradle comprising the base plate or member 6 and cradle standards 7 may be identical in every respect with that disclosed in Figures 1 to 7 inclusive. The hubs 25 formed on the end casting bosses 24 are, however, of a different shape from the hubs 5 shown in Figures 1 to 3 inclusive. As shown particularly in Figure 12, these hub members 25 are substantially rectangular in cross section, but have cutaway notches 26 formed therein and also preferably have a pair of screw-threaded bores 27a in the end face thereof to provide for the attachment thereto of a metal lock ring 27 by screws 28. This lock ring 27 cooperates with the shoulder 29 defined at the intersection of the hub 25 with the boss 24 to define with the notches 26 a plurality of annularly disposed recesses for the reception of the inwardly disposed blocks 32 of rubber or the like, as shown particularly in Figure 9. It will thus be seen that the blocks 32 may be securely held in the annularly disposed recesses. The upper outwardly extending ends of the blocks 32 are supported by oppositely disposed metal clamp members 33 each pair of which form a clamp ring, and which are attached to the horizontal flanges 8 of the cradle standards 7 in the same manner as are the angles 13 of the motor supports disclosed in Figures 1, 2 and 3.

In order to prevent movement of the blocks 32 with respect to the clamp members 33 in a direction parallel to the motor axis, the clamp members 33 are provided with a plurality of struck-up ears 34 which, as shown particularly in Figure 10, will prevent such movement. Only one set of these ears, disposed on the outer edges of the clamp members 33, as shown in Figure 10, may be used, or I may use a pair of such ears adapted to engage opposite side faces of the blocks 32, as shown in Figure 13. It will thus be seen that the motor support hubs 25 are insulated by the blocks 32 from the clamp members 33, which are integrally secured to the cradle standards 7 of the base cradle. The lower ends of the blocks are securely held in the annularly disposed recesses defined by the lock ring 27, the shoulder 29 and the annularly disposed notches 26. The advantages inherent in the motor support means disclosed in Figures 1 to 7 inclusive are all achieved by the above-described structure, and it is to be understood that this structure is susceptible of application in like manner and in every relation, where the use of such structure as that disclosed in Figures 1 to 7 inclusive may be found desirable.

While I have illustrated certain parts of my construction as composed of pressed metal and have described other parts as of rubber, it will be understood that I do not desire to limit myself to the use of such materials or such constructions, but that I include in the term "rubber" such substitutes therefor as may be found to have the desired characteristics of rubber in the relation in which it is used, and which substitutes may be more desirable than rubber under certain conditions, where a higher resistance to oils and the like than that of rubber is desired, and it is obviously understood that such parts as I have described or illustrated, as of pressed metal, may, if found desirable, be manufactured in any desired way, of any desired materials, my disclosure being merely illustrative and in no wise limiting.

It will be understood that I desire to comprehend within my invention such modifications as come within the scope of the claims and the invention.

Having thus fully described my invention, what I claim as new and desire to secure by Letters Patent is:

1. In supporting means for a rotary mechanism having an axially disposed non-circular hub thereon and supported by said hub in a cradle having support members thereon adapted to engage said hub; a pair of support members oppositely disposed about said hub, said pair of support members comprising a clamp ring adapted to be supported by said cradle, said clamp ring being adapted to support a plurality of spaced resilient blocks between the ring and the non-circular hub retained therebetween by their inherent resiliency and resisting relative rotation between said ring and said hub.

2. In supporting means for a rotary mechanism having axially disposed non-circular hubs thereon and supported by said hubs in a cradle having support members thereon adapted to engage said hubs; a pair of support members oppositely disposed about each hub, each pair of said support members forming a clamp ring adapted to be supported by said cradle and adapted to support in spaced relation a plurality of resilient blocks between the ring and the non-circular hub, each retained therebetween by their inherent resiliency with a central portion thereof free of the ring and hub so that rotation of the hub with respect to the ring will be resisted by the resiliency of the blocks.

3. In supporting means for a mechanism having a rotary power shaft with non-circular hubs at each end thereof surrounding the power shaft and supported by said hubs in a cradle having support members thereon adapted to engage said hubs; support members oppositely disposed about each hub to form a closed support therefor, said support members forming clamp rings adapted to be non-rotatably supported by said cradle, each of said clamp rings being adapted to support the opposite end portions of a plurality of spaced resilient blocks between said ring and the non-circular hub in such a manner as to resist relative rotation between the hubs and the rings and to damp vibrations of the mechanism in operation by the force of rubber in shear.

4. Supporting means for a rotary mechanism including a prime mover comprising an axially disposed hub on the mechanism having radially disposed notches therein, a pair of oppositely disposed members forming a clamping ring surrounding said hub and a plurality of spaced resilient blocks retained by their inherent resiliency between said rings and said hub, each having one end in one of said notches, the other end thereof in engagement with said ring and a central portion free of support.

5. Supporting means for a rotary mechanism comprising a pair of axially disposed hubs on the mechanism, each having radially disposed notches therein, a clamping ring surrounding each of said hubs, and a plurality of rubber blocks disposed between each of said rings and each of said hubs, each of said blocks having one end in one of said notches, the other end thereof in engagement with said ring and an intermediate portion free of support.

6. Supporting means for a rotary mechanism comprising a pair of axially disposed hubs on the mechanism, each having radially disposed notches therein, a clamping ring surrounding each of said hubs, and a plurality of rubber blocks disposed between each of said rings and each of said hubs, each of said blocks having one end in one of said notches, the other end thereof in engagement with said ring and an intermediate portion free of support, said ring having a projection thereon adapted to engage one side of each of said blocks to prevent relative movement therebetween, whereby rotation of said hubs in said cradle is resisted by the resiliency of said blocks in shear.

7. Supporting means for a rotary mechanism comprising a pair of axially disposed hubs on the mechanism, each having radially disposed notches therein, a clamping ring surrounding each of said hubs, and a plurality of rubber blocks disposed between each of said rings and each of said hubs, each of said blocks having one end in one of said notches, the other end thereof in engagement with said ring and an intermediate portion free of support, said ring having projections on each side thereof adapted to engage both sides of each of said blocks to prevent relative motion therebetween, whereby rotation of said hubs in said cradle and relative movement between the blocks and the rings is resisted by the resiliency of said blocks in shear.

STEFFEN A. BROWN.